(No Model.) 2 Sheets—Sheet 1.
G. STEVENSON.
BROADCAST SEED SOWER.
No. 394,084. Patented Dec. 4, 1888.
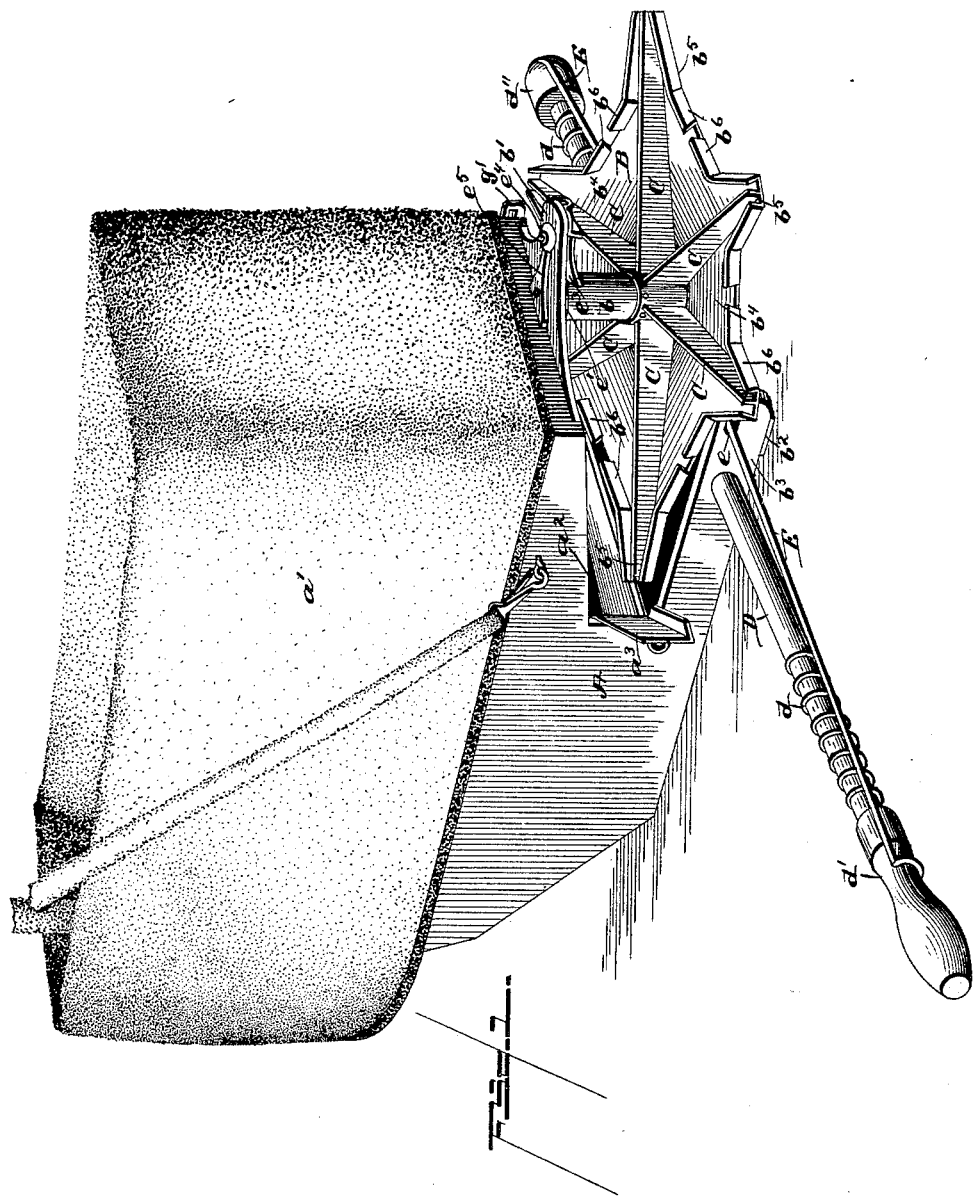
WITNESSES
INVENTOR,
George Stevenson
By Ayers &co Attorneys.

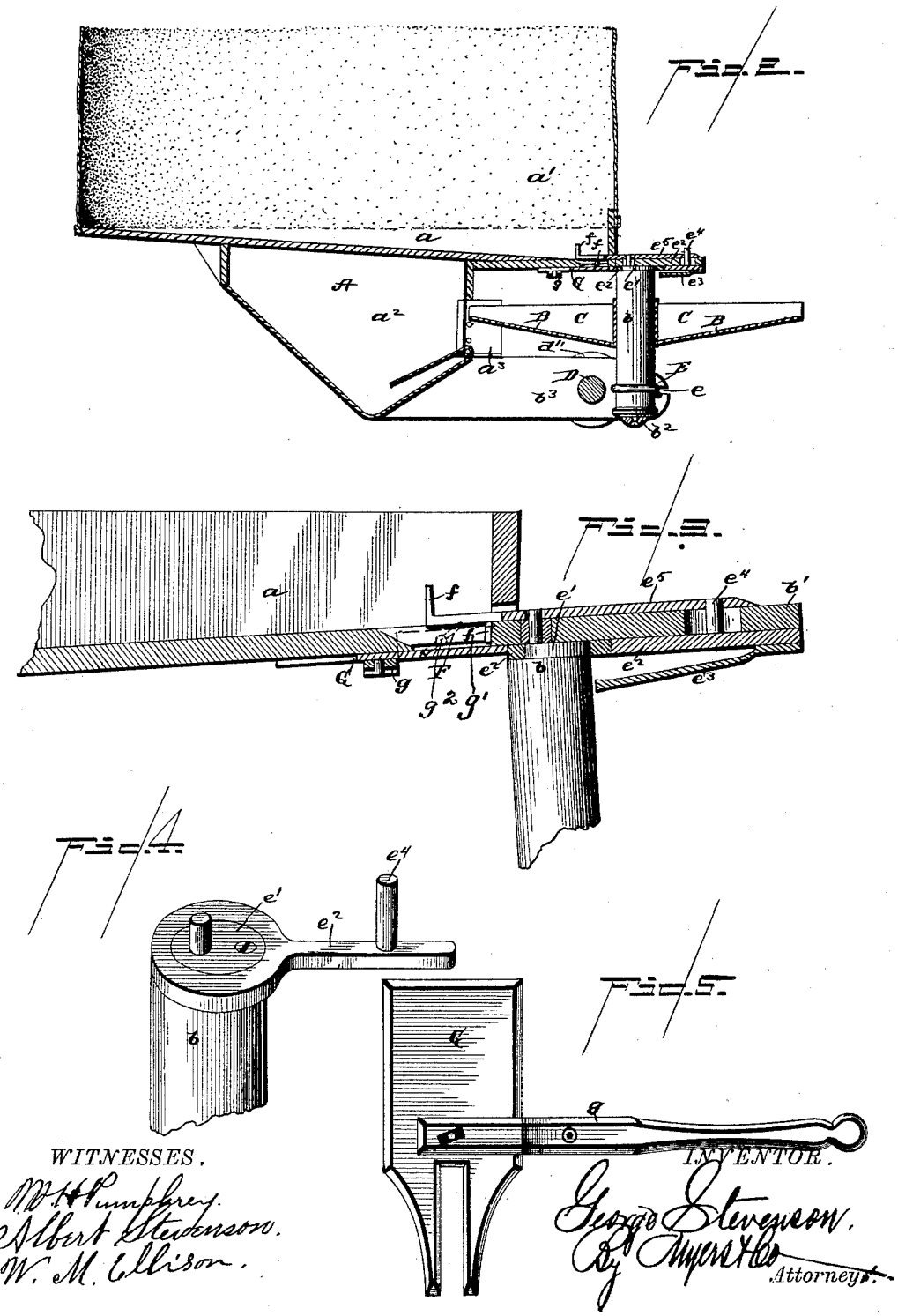

UNITED STATES PATENT OFFICE.

GEORGE STEVENSON, OF NORTHFIELD, INDIANA.

BROADCAST SEED-SOWER.

SPECIFICATION forming part of Letters Patent No. 394,084, dated December 4, 1888.

Application filed June 8, 1888. Serial No. 276,434. (No model.)

*To all whom it may concern:*

Be it known that I, GEORGE STEVENSON, a citizen of the United States of America, residing at Northfield, in the county of Boone and State of Indiana, have invented certain new and useful Improvements in Broadcast Seed-Sowers, of which the following is a specification, reference being had therein to the accompanying drawings.

This invention pertains to certain new and useful improvements in broadcast seed-sowers, having for its object the provision of simple and highly-efficient means whereby the waste of grain heretofore experienced in the employment of reciprocating distributing-wheels is avoided, and also to provide improved means to prevent clogging of seed at the hopper-outlet.

The invention therefore comprises the details of construction, combination, and arrangement of parts, substantially as hereinafter fully set forth, and particularly pointed out in the claims.

In the accompanying drawings, Figure 1 is a view in perspective of my invention. Fig. 2 is a central longitudinal sectional view thereof. Fig. 3 is an enlarged detail sectional view. Figs. 4 and 5 are enlarged detail perspective views.

Referring to the drawings, A designates the box or receptacle of my improved seed-sower, in the upper portion of which is a hopper, $a$, to which is secured the lower end of a bag or casing, $a'$, wherein the seed is placed. Immediately beneath the rear portion of this hopper is formed a chamber, $a^2$, to the outer ends of the side walls of which are secured inclined outwardly-projecting plates $a^3$ $a^3$, as shown. This chamber is designed to catch and retain therein seed thrown from the arms of the revolving wheel when passing in front thereof.

B is an intermittent or oscillating distributing-wheel rigidly attached at its center to a vertical shaft, $b$, secured at its upper end to a front central projection, $b'$, and at its lower end upon a cross-bar, $b^2$, attached to outwardly-projecting arms $b^3$ $b^3$ of the box or receptacle. This distributing-wheel is composed of an inclined disk, $b^4$, provided with outwardly-projecting tapering arms $b^5$, having upturned edges or flanges $b^6$, which at the outer ends of said arms are slightly inclined, so as to form narrow openings for the passage of seed. To the upper surface of this disk, at about the center of the arms, are secured ribs or veins C, which project slightly above the flanges $b^6$. The object of this construction is to prevent seed from falling off the wheel when the movement of the latter is suddenly reversed, said arrangement causing the seed to fall back toward the center of the wheel and prevent spilling thereof.

D is a bow or rod passed through and resting in holes or apertures in the arms $b^3$, and upon this bow or rod are disposed two coil-springs, $d$ $d$, which at their outer ends are secured one to a handle, $d'$, and the other to an end block, $d''$, and the inner ends thereof are designed to strike against the arms $b^3$ when the bow or rod is reciprocated. To the handle $d'$ and end block, $d''$, of this bow are secured the ends of a strap or cord, E, which passes between slots $e$ of the arms $b^3$, and is passed around the lower portion of the vertical shaft $b$, whereby by moving the bow or rod in either direction the wheel will be caused to rotate rapidly, effecting the distribution of the seed over the ground.

Upon the upper end of the shaft $b$ is secured an eccentric or cam, $e'$, which moves in a circular hole or opening of a sliding plate, $e^2$, which is supported by a keeper-plate, $e^3$, attached to the under side of the front central extension, $b'$. From this plate $e^2$ extends a stud or pin, $e^4$, which is projected through a hole or aperture in said extension $b'$, and through a small aperture in a circular portion of a second sliding agitating-plate, $e^5$, which projects over the outlet-opening F of the hopper. This agitating-plate has upper and lower teeth, $f f$, which effect the feeding of the grain through the outlet and prevent clogging of same.

G is a gate suitably secured to the under side of the hopper so that one end will extend over the outlet-opening, and the same is actuated by means of a short lever, $g$, extending beyond one of the side walls. An adjustable plate, $g'$, is attached to the side of the box or receptacle and is held by a set-screw, $g^2$, at the desired point, according to the extent it is desired to move the lever $g$.

From the foregoing description it will be seen that seed placed in the hopper and bag will fall through the outlet-opening onto the distributing-wheel, and the operator, by grasping the handled end of the bow or rod and moving the same in either direction, will effect the revolution of said wheel, causing the seed to fly out through the ends of the arms thereof.

By means of the springs on the bow or rod the shock usually experienced when either end of the bow strikes the side arms is avoided, and, further, an initial movement is given to said bow in starting in a reverse direction. In thus reversing the movement of the distributing-wheel the seed, instead of falling out onto the ground in a quantity, as has heretofore been the case, will, by reason of the upturned edges or flanges of the seed-wheel, be prevented, and will fall back toward the center of the wheel. The chamber in the box or receptacle A will receive all seed distributed by the arms in passing the end thereof, and thus this seed, which has heretofore fallen on ground already sown, is retained in said chamber. By means of the agitator-plate the seed will be prevented from clogging the outlet-opening, and thus a free supply of seed is always had to the distributing-wheel.

My invention embodies advantages in point of simplicity, durability, general efficiency, and inexpensiveness.

I claim as my invention—

1. As an improvement in seed-sowers of the class herein described, the intermittent or oscillating wheel composed of an inclined disk having a series of outwardly-projecting tapering arms provided with apertured or flanged edges, in combination with the bow or rod and the strap or cord, substantially as shown and described.

2. As an improvement in seed-sowers of the class herein described, the intermittent or oscillating wheel having a series of arms provided with upturned or flanged edges, and the centrally-disposed ribs or veins, in combination with the means for operating said wheel, substantially as shown and described.

3. The combination, with the hopper having the outlet-opening and a front central extension provided with an aperture, and the wheel, together with its shaft, having a cam or eccentric secured thereon, of the sliding plate $e^2$, the keeper-plate for holding said sliding plate against said extension, the steel or pin projecting from said sliding plate through said aperture, and the agitating-plate bearing on the upper surface of said extension, and having upper and lower teeth, $f\,f$, working in said outlet-opening, substantially as described.

4. The herein-described improved seed-planter, comprising the box or receptacle having the chamber $a^2$, provided with outwardly-projecting plates, the hopper having the outlet-opening, the sliding gate moving beneath said opening, the lever therefor, the adjustable plate secured to one side of the box or receptacle, the intermittent or oscillating wheel having arms provided with upturned flanges and ribs or veins, the vertical shaft, the cam or eccentric, the sliding plate having a stud or pin, the agitating-plate secured to said stud or pin and having teeth at its inner end, the bow or rod, the springs thereon, and the cord or strap, substantially as shown and described.

In testimony whereof I affix my signature in presence of two witnesses.

GEORGE STEVENSON.

Witnesses:
MICHAEL KEEFE,
RILEY HAUSER.